(12) United States Patent
Gutlapalli et al.

(10) Patent No.: US 9,792,307 B2
(45) Date of Patent: Oct. 17, 2017

(54) ENTERPRISE-BASED SEARCHING OF NEW AND UPDATED DATA

(75) Inventors: Hari Krishna Gutlapalli, Union City, CA (US); Suhas Rohit Mehta, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 545 days.

(21) Appl. No.: 12/844,310

(22) Filed: Jul. 27, 2010

(65) Prior Publication Data

US 2012/0030188 A1    Feb. 2, 2012

(51) Int. Cl.
*G06F 17/30*    (2006.01)

(52) U.S. Cl.
CPC .. *G06F 17/30306* (2013.01); *G06F 17/30336* (2013.01)

(58) Field of Classification Search
CPC ............. G06F 12/0866; G06F 11/2074; G06F 17/30539; G06F 17/30696; G06F 17/30292; G06F 17/30; G06F 17/30174; G06F 17/30306; G06F 17/30336; G06F 17/30578; G06F 17/30286; G06F 17/3053; G06F 17/30168; G06F 2212/312

USPC ....... 707/706, 707, 711, 713, 722, 736, 758, 707/781, 999.003–999.006

See application file for complete search history.

(56) References Cited

U.S. PATENT DOCUMENTS

| | | |
|---|---|---|
| 6,070,158 A | 5/2000 | Kirsch et al. ..................... 707/3 |
| 2007/0130137 A1 | 6/2007 | Oliver et al. ..................... 707/5 |
| 2008/0059524 A1* | 3/2008 | Biedenstein et al. ...... 707/104.1 |
| 2010/0088316 A1 | 4/2010 | Robinson et al. ............ 707/737 |

* cited by examiner

*Primary Examiner* — Syling Yen
(74) *Attorney, Agent, or Firm* — Sheppard Mullin Richter & Hampton LLP (57) ABSTRACT

A searchable staging data store is provided, which stores new and updated records during a period of entry of those records to an enterprise-accessible data store and update of a search index with information from those records. The searchable data store provides rapid access to the data during that period of entry. Embodiments provide for searching a search index for records responsive to a search query, searching the searchable staging data store for records responsive to the search query, receiving search results from both the search of the search index and the searchable staging data store, and displaying those results.

26 Claims, 6 Drawing Sheets

ENTERPRISE-BASED SEARCHING OF NEW AND UPDATED DATA

FIELD OF THE INVENTION

The field of the present invention relates to searches of enterprise data, and specifically to improving efficiency of searches of new and updated data to an enterprise data store.

BACKGROUND OF THE INVENTION

Business entities collect, store and use significant amounts of data on a day-to-day basis. Quick and ready access to that data drives transaction-related applications and operations of the business entity. An enterprise-class business entity can collect hundreds to thousands of new and updated business records from across the entity every minute. Those new and updated records can be entered into one or more data stores accessible to users throughout the enterprise. Users can access that data by using direct calls to the data store or through searches of the data store or an associated search index.

In order to optimize speed and performance in finding relevant records for a search query, records in a data store can be processed for a variety of information that can be entered into a search index. Without an index, a search process performing a search would have to scan every record in a data store, which can consume significant time and computing resources. A search engine index, on the other hand, collects, parses, and stores data in a manner to facilitate fast and accurate information retrieval.

In an enterprise-class business entity having a large number of new entries and update entries being made to a data store, there can be a significant delay between a time of entry of the new or updated record into the data store and a time when information related to that new or updated record is merged into the search index associated with the data store. During that period, a search of a search index for the new or updated information will yield no or outdated results. In such an instance, a lengthy and time consuming search of the data store for the new or updated record would have to be performed. Such a search of a large enterprise-wide data store can take many minutes to several hours, depending upon the size of the data store and the nature of the search. In an environment in which a search is being conducted in response to, for example, a telephonic customer query of a customer service representative, such a lengthy delay in response time can be unacceptable.

It is therefore desirable to have a system in which new or updated records to a data store can be quickly searched during a time period prior to information related to those records being entered into a search index.

SUMMARY OF THE INVENTION

Embodiments of the present invention provide a searchable staging data store for new and updated records during a period of entry of those records to an enterprise-accessible data store and update of a search index with information from those records. This searchable data store enables rapid access to the data during that period of entry. Embodiments of the present invention provide a method, system and computer readable storage medium that enable searching a search index for records responsive to a search query, searching the searchable staging data store for records responsive to the search query, receiving search results from both the search of the search index and the searchable staging data store, and displaying those results. The search index is associated with and stored in a first data store. The searchable staging data store stores records that include information queued for entry into the search index.

Another embodiment further provides for parsing the search query into a format usable by the search index and also parsing the search query into a format usable by the searchable staging data store.

A further aspect of the above embodiment provides for the searchable staging data store comprising records including information entered into the first data store and queued for entry into the search index. Another aspect of the above aspect includes records queued for entry into the first data store being stored in the second data store.

Another aspect of the above searching the search index for records responsive to the search query provides for parsing the search query to a first input format search query for a search engine associated with the search index and providing that first input format search query to the search engine. A further aspect includes searching the searchable staging data store by parsing the search query to a second input format search query for a search utility associated with the searchable staging data store, and providing that second input format search query to the search utility.

A further embodiment of the above invention provides for storing the searchable staging data store in a memory. The searchable staging data store is a database that includes a search utility. Another embodiment of the above invention provides for receiving the search query from a remote network node, which is coupled to an enterprise server that performs the searching of the search index and searchable staging data store. A further aspect of this embodiment provides for a customer response management system to include the enterprise server, the remote network node, the first data store and the searchable staging data store.

The foregoing is a summary and thus contains, by necessity, simplifications, generalizations and omissions of detail. Consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Embodiments of the present invention provide a searchable staging data store for new and updated records during a period of entry of those records to an enterprise-accessible data store and update of a search index with information from those records. Embodiments of the present invention provide for receiving a search request for information in the enterprise-accessible data store and performing an associated search on both the search index and the staging data store for responsive records. In this manner, a time-intensive search of records stored in the enterprise-accessible data store itself in order to find new or updated records is unnecessary.

An enterprise-accessible data store can be implemented in a variety of ways and used for a variety of functions. Embodiments of the present invention are not limited to a particular form or function of an enterprise-accessible data store. For example, an enterprise-accessible data store can take the form of a document repository holding files of import to an entire enterprise. As another example, an enterprise-accessible data store can be a database associated with a customer response management system used by sales, support, and management of an enterprise. One example of such a customer relationship management environment is provided below.

An Example Customer Relationship Management Environment

Figure 1:
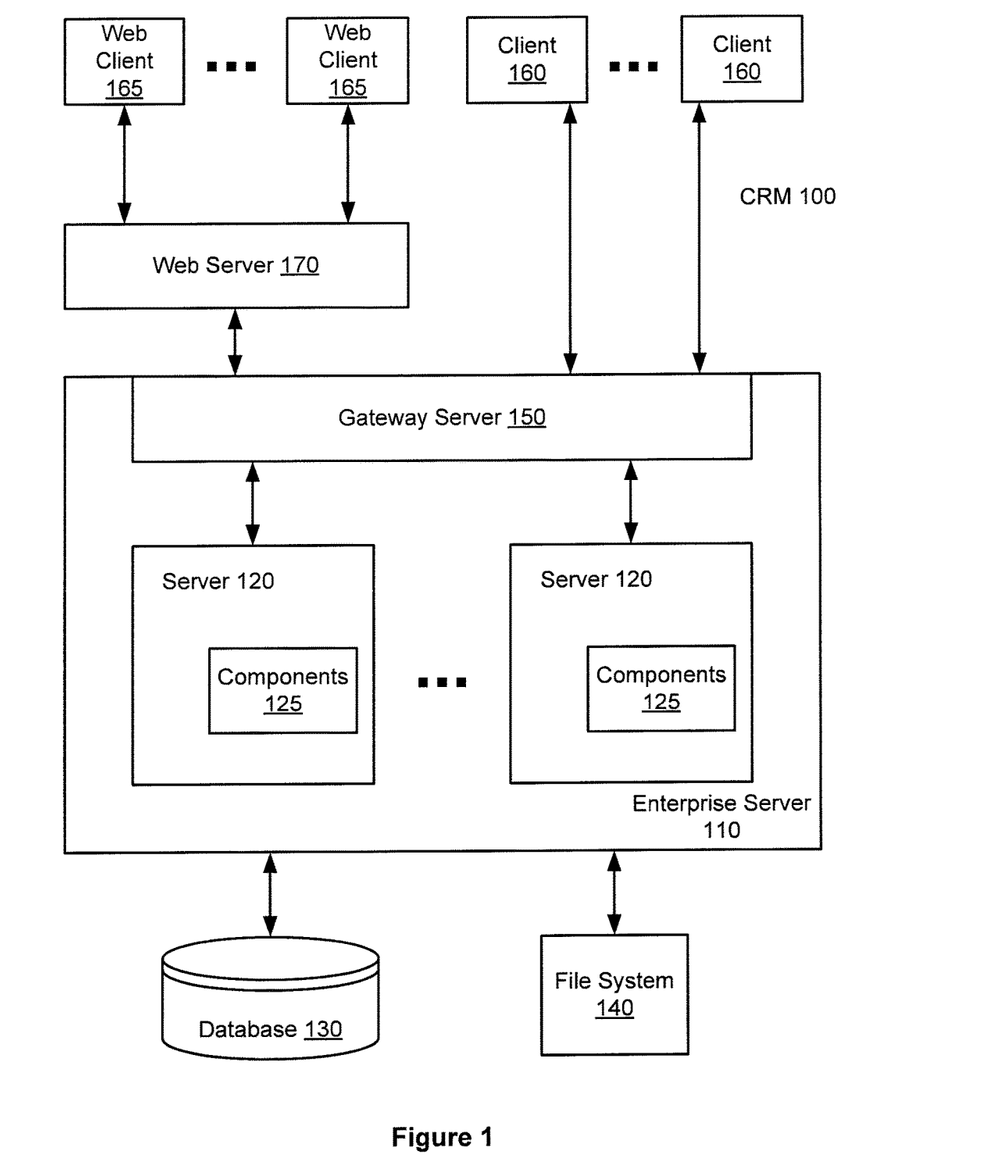
FIG. 1 is a simplified block diagram illustrating a customer relationship management architecture usable in conjunction with embodiments of the present invention.

FIG. 1 is a simplified block diagram illustrating a customer relationship management architecture usable in conjunction with embodiments of the present invention. The illustrated customer relationship management environment includes an enterprise server 110 that is a logical grouping of one or more servers 120 that support a group of clients (160,165) accessing a common database 130. An enterprise server can be configured, managed and monitored as a single logical group, allowing an administrator to start, stop, monitor or set parameters for servers 120 within enterprise server 110. In such a configuration, parameters for the customer relationship management system can be set at the enterprise server level, and these parameters can apply to every server operating within the enterprise server. In addition, other parameters can be adjusted at a server (120) level to support fine tuning of those parameters. In this hierarchical parameter context, if a parameter is set at a server level, then the server-specific value for the parameter can override an enterprise server-level setting for the parameter. Further, parameter settings at a component level (processes executed on servers 120) will override those set at the server level.

Servers 120 can support back-end and interactive processes for each client accessing the server. These processes are illustrated as one or more components 125 within each server. A server 120 can support, for example, multiprocess and multithreaded components, and can operate components in background, batch, and interactive modes. A server component can also operate on multiple servers 120 simultaneously to support an increased number of users or larger batched workloads. Examples of component processes include, for example, mobile web client synchronization, operation of business logic for web clients, connectivity and access to database and file system for clients, integration with legacy or third-party data (e.g., data not native to the CRM system), automatic assignment of new accounts, opportunities, service requests, and other records, and workflow management. Embodiments of the search and updating processes of the present invention can also be implemented to execute on one or more of servers 120 as components.

Servers 120 are coupled to a gateway server 150, illustrated as part of enterprise server 110. Gateway server 150 can coordinate the operations of enterprise server 110 and servers 120. A gateway server can provide persistent storage of enterprise server configuration information, including, for example, definitions and assignments of component groups and components, operational parameters, and connectivity information. A gateway server can also serve as a registry for server and component availability information. For example, a server 120 within enterprise server 110 can notify gateway server 150 of availability. Connectivity information such as network addresses can be stored in a storage accessed by gateway server 150. If a server 120 shuts down or otherwise becomes unavailable, connectivity information related to that server can be cleared from gateway server 150.

Through their relationship in enterprise server 110, servers 120 and their components 125 can access one or more data stores (e.g., databases 130 and file systems 140). Database 130 can store, for example, RDBMS client software and tables, indexes, and data related to all operations impacted by the CRM system. Database information can include, for example, customer information, market data, historical pricing information, current pricing information, contact information, and the like. Similarly, file system 140 can store data and physical files used by clients 160 and 165 and enterprise server 110. File system 140 can be a shared directory, or set of directories on different devices, which is network-accessible to all servers 120 in enterprise server 110. In order for a client to gain access to files in file system 140, a client can connect to an appropriate server 120 to request file uploads or downloads. Server 120 can then access file system 140 using, for example, a file system management component.

As stated above, embodiments of the search and update processes of the present invention can be implemented to execute as components on one or more of servers 120, accessing database 130 to store and retrieve data. An alternative embodiment provides a separate server accessible by the same or different web server.

Clients 160 and 165 provide access to enterprise server 110 for agents using the customer relationship management system. Clients communicate to enterprise server 110 through gateway server 150 either directly (e.g., client 160) or via a web server 170 (e.g., clients 165). A web server 170 can provide a mechanism by which enterprise server 110 can respond to web-based requests (e.g., HTML, XML, and the like). Web clients 165 can include clients coupled to web server 170 via a local area network, metro-area network or wide area network and propagated over a variety of communications media, as discussed above. Further, web clients 165 can include mobile clients accessing web server 170 through wireless communications means. Users of clients 160 and web clients 165 can include, for example, sales agents, service agents, customer representatives, managers of the business entity using the CRM, and the like. Users have access to all information accessible to enterprise server 110 in database 130, as controlled by a user's secured access rights.

Clients 160 and web clients 165 can be distributed throughout an enterprise and can include hundreds or thousands of such clients. Each client can perform tasks related to either creating new records to be stored in, for example, database 130, modifying records in database 130, or searching for information stored in database 130. This large number of requests and entries can create a backlog between entry of the data into database 130 and information related to the created and modified records into a search index associated with database 130.

Updating Data in Search Database

Figure 2:
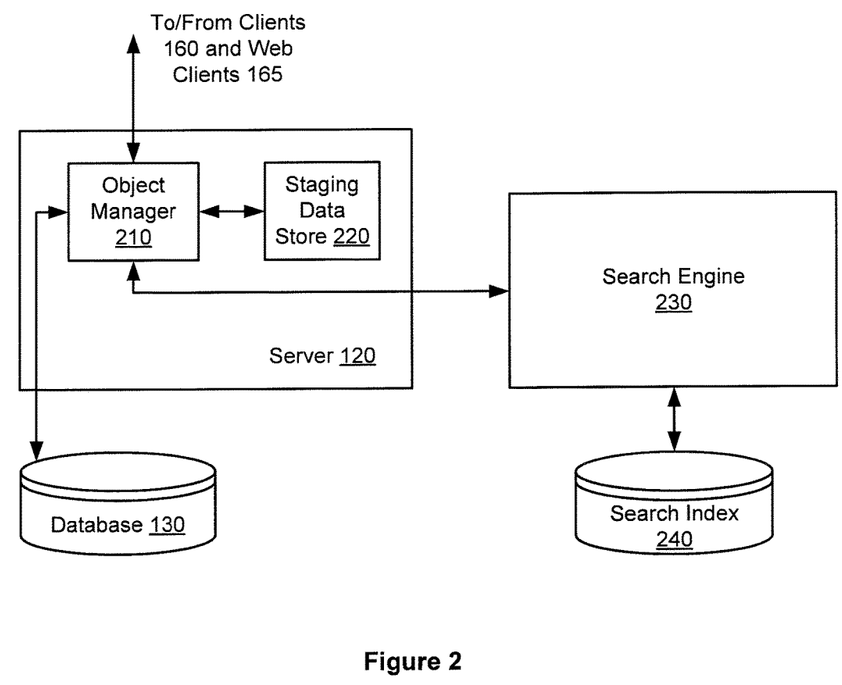
FIG. 2 is a simplified block diagram illustrating a flow of data during a process of adding a record or modifying a record in a database.

FIG. 2 is a simplified block diagram illustrating a flow of data during a process of adding a record or modifying a record in a database 130. A server 120 can have an object manager process 210 (corresponding to a component 125) executing on the server. The object manager can include business logic for a desired task along with mechanisms to access different data sources, such as database 130 and a search engine 230. Object manager process 210 can receive requests to create, modify or search for records in database 130 from clients 160 and 165. Object manager process 210 can store new and modified data records in a staging data store 220. The new and modified records can also be provided to database 130 to update the information stored there. Information is retained in the staging data store until it can be provided to search engine 230 for inclusion in search index 240, after which the record in the staging data store is removed.

Search engines typically use one or more search indexes in order to facilitate quick location of data objects that match search criteria. Using a search index a large number of data objects can be queried for specified words within milliseconds, whereas a sequential scan of every word in the data objects in the database, could take hours, especially if the data objects are large. The trade off for the time saved during information retrieval is that additional computer storage is required to store the search index, and that it takes time for the search engine to create and update the search index.

Search indexes vary in architecture to meet various design factors such as the amount of memory needed to store the index, how to store the index data, and the like. In general, search indexes contain entries, each of which maps a keyword to one or more identifiers that identify respective data objects that contain one or more instances of the keyword. Search indexes may include additional information such as the frequency of each keyword in the data objects or the positions of the keyword in data objects.

The larger the number of created and updated records that are being received in a period of time, the more records that may be stored in staging data store 220 awaiting inclusion in search index 240. This is due to records needing to be processed prior to inclusion in the search index. The ability of search engine 230 to process the records may not match the speed in which new and modified records are arriving at server 120.

Staging data store 220 can take a variety of forms. In one form, staging data store 220 can be a solid-state memory-based data store on server 120. Alternatively, staging data store 220 can be an area of memory on one or more disk volumes coupled to server 120. No matter the type of memory implementation used for the staging data store, that area of memory can be made accessible to each server 120 that provides a component 125 accessing database 130. In this manner, information stored in staging data store 220 can be made available to those components and those components can write information to the staging data store as needed. As will be discussed more fully below, embodiments of the present invention provide for search access of staging data store 220.

Figure 3:
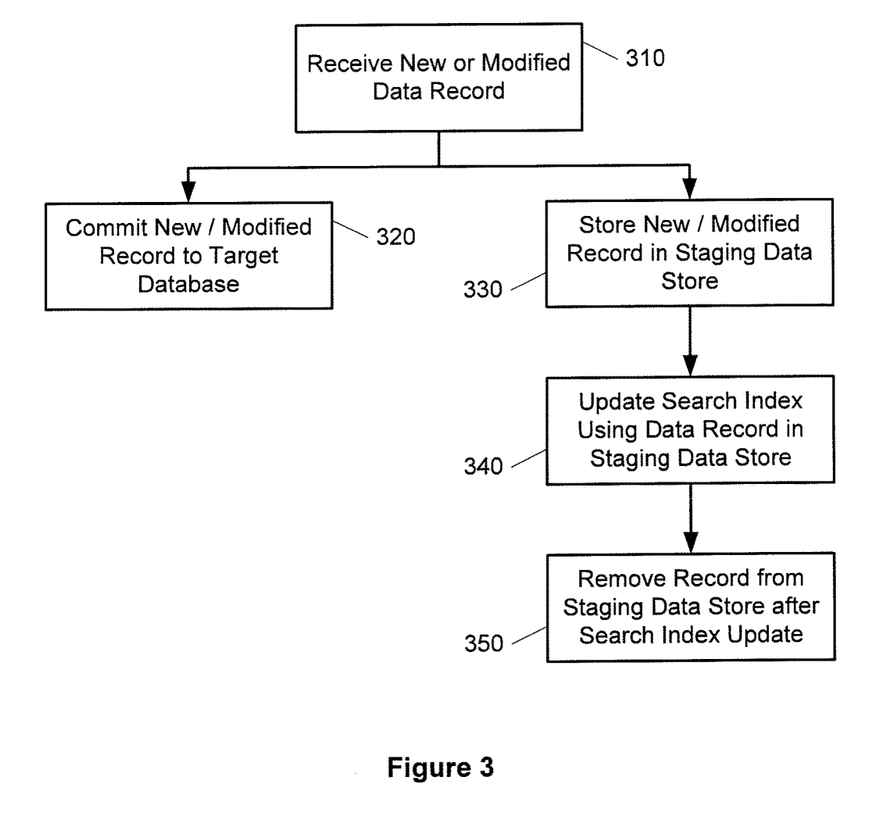
FIG. 3 is a simplified flow diagram illustrating a process for including created or modified data records in a master data store (e.g., a database) and a search index.

FIG. 3 is a simplified flow diagram illustrating a process for including created or modified data records in a master data store (e.g., database 130) and a search index (e.g., search index 240). An object manager or other component can receive a new or modified data record (310), for example, from a client 160 or web client 165. The object manager can then commit the new or modified record to the master data store (320). Committing the new or modified record to the master data store involves providing the record to the master data store for insertion of a new record or modification of an old record.

In parallel with committing the new or modified record to the master data store, the object manager can store information associated with the new or modified record to a staging data store (e.g., staging data store 220) (330). Subsequent to storing the information associated with the new or modified record in the staging data store, the search index associated with the master data store can be updated using information in the new or modified data record found in the staging data store (340). Such an update of the search index can be performed by processing the new or modified record in a manner compatible with the search index and merging the processed information into the search index (e.g., creating a new index value for a new record or modifying an existing index with information from the modified record). A variety of search engine architectures can be used and embodiments of the present invention are not limited to a particular search engine architecture. Examples of search index updating can be found in co-pending U.S. patent application Ser. No. 11/875,495 ("Restoring Records Using a Change Transaction Log"), Ser. No. 11/875,542 ("Transferring Records Between Tables Using a Change Transaction Log"), and Ser. No. 11/875,466 ("Push-Model Based Index Deletion").

Once the search index has been updated, the new or modified record can be removed from the staging data store (350). For example, a search engine 230 can receive the new or modified record, perform the necessary processing of that record to include the information from that record in the search index, and then once that processing has been completed will inform the object manager that the update is completed and the object manager can remove the record from the staging data store.

FIG. 3 is illustrative of one example of entry of a new or modified data record. Alternative embodiments for inclusion of records in both a master data store and a search index associated with that data store are available. For example, an object manager can store a new or modified data record in a staging data store in memory as that new or modified data record is received. That new or modified data record can then be committed to the master data store. Once such a commitment of data has been performed, the information in the staging data store can be modified to prepare it for inclusion in the search index (e.g., pre-processing the record into an appropriate form for merging into the search index so that the search engine need not do such processing). Once the new or modified record has been pre-processed in such a manner, the record can be stored in a second staging data store or within a separate defined memory region of the first staging data store. The search engine can then be updated using the processed record and then the processed record can be deleted from the staging data store. Such a method of pre-processing incoming new or modified records may include throughput of the new or modified record information to the search index by distributing the processing workload (e.g., using resources of a more powerful server 120 over a search engine 230).

Figure 4:
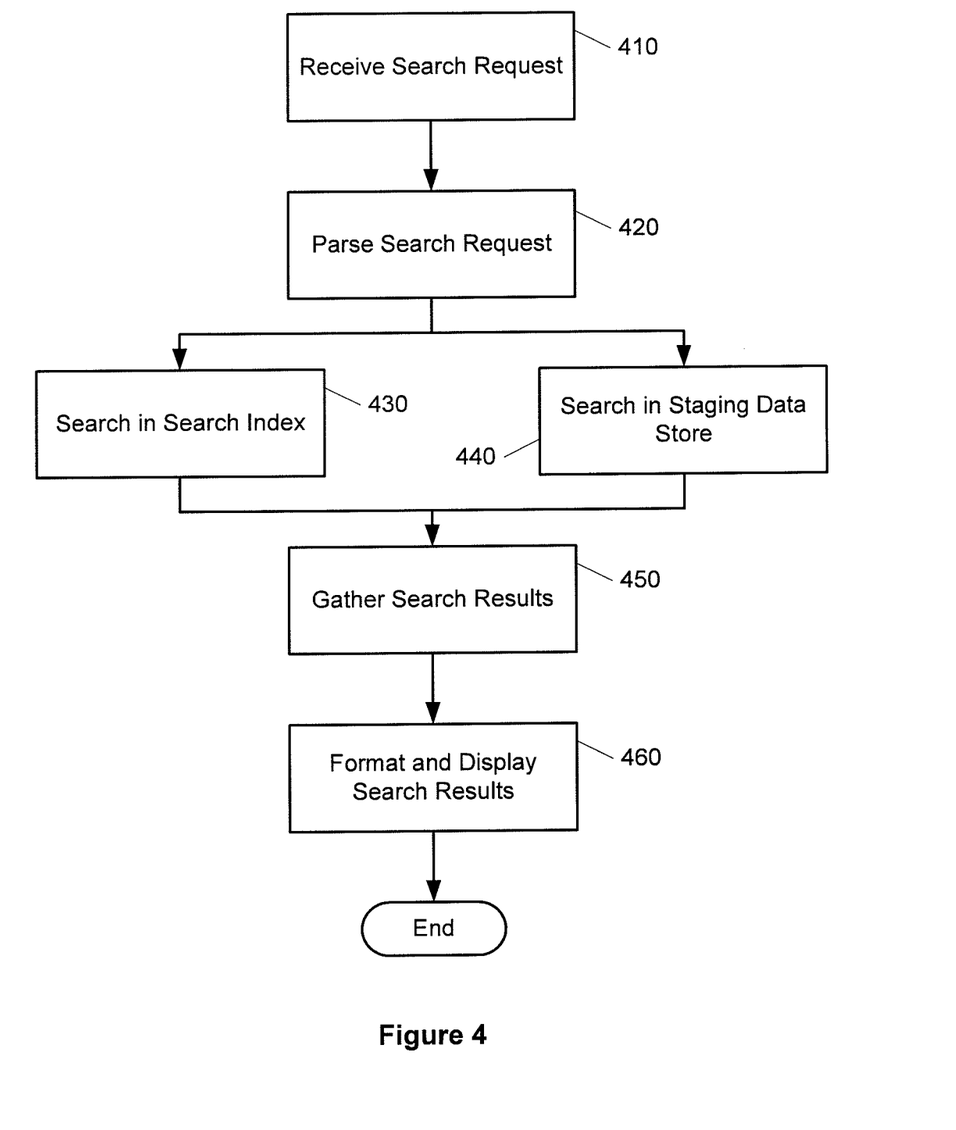
FIG. 4 is a simplified flow diagram illustrating an example of a search process performed in accord with embodiments of the present invention.

FIG. 4 is a simplified flow diagram illustrating an example of a search process performed in accord with embodiments of the present invention. As indicated above, staging data store 220 can be provided with a search utility in order to quickly locate new and modified records that have yet to be included in the search index. In order to access this information, an object manager 210 can perform parallel searches of one or more staging data stores.

In FIG. 4, a search request is received from a client 160 or 165 (410). In response to receiving the request, object manager 210 can parse the search query in a manner appropriate for both the search index associated with the target data store (e.g., database 130) and any staging data stores associated with the target data store and the associated search index (420). Since the search protocols associated with the search index and the staging data store can be different due to the different formats of data stored in both locations and the different purposes for that data stored in those locations, parsing of the search request for each of those search targets will be different. In addition, there may be more than one staging data store to be searched by the object manager. For example, in the second scenario discussed above with regard to updating a data store and an associated index, a first staging data store can hold a new or modified record and a second staging data store can hold a pre-processed record ready for inclusion in the search index. In order to fully search for a new or modified record, all associated staging data stores should be searched for information responsive to the search request.

Once the search query is parsed, each parsed search query can be provided to the associated target for that parsed search query. A parsed search query can be provided to the search engine, which will then search the search index (430). The parsed search query can also be provided to a staging data store, which then performs a search of the staging data store (440). As stated above, this step can be performed for each staging data store that is used in the particular implementation in the enterprise. Provision of the parsed search requests can be performed using a variety of communication protocols and interfaces (e.g., an API associated with the staging data store). Once the searches have been performed, the search index and the staging data stores can provide the results of those searches to the object manager or other requesting component, which gathers the search results (450).

Once all the search results are gathered, the component performing the search can format the search results and provide a display user interface to the requesting client or a target client (460). A display user interface can take a variety of forms depending upon which is most appropriate for the particular implementation in the enterprise. For example, records can be separated based upon the source of the data retrieved by the request. Information retrieved from the search index request can be displayed in a first section, while information displayed from each staging data store can be displayed in sections associated with each of the staging data stores. In such a manner, a user reviewing the displayed results can determine whether they are reviewing newly created or modified data or data which has been stored in the target data store for a longer period of time. Such information may be useful to a user trying to differentiate between old and new data. In addition, the display user interface can be user configurable, where the user can provide preferences. For example, a user can configure the display user interface in a manner that provides information associated with a particular source at the top of the display page. Or a user can configure the display user interface to provide a specific ordering of results.

Using such a search methodology overcomes practical issues related to a time lag in the update of search indexes from associated master data stores. Typically the larger the search index, the longer the lag time. Through a search of a staging data store, the need to search the master data store itself for such new or modified records is eliminated. In addition, embodiments of the present invention also allow for quick search of new or modified records in the staging data store and old records in the master data store if for some reason the search index or search engine becomes unavailable.

An Example Computing and Network Environment

As shown above, the present invention can be implemented using a variety of computer systems and networks. An example of one such computing and network environment is described below with reference to FIGS. 5 and 6.

Figure 5:
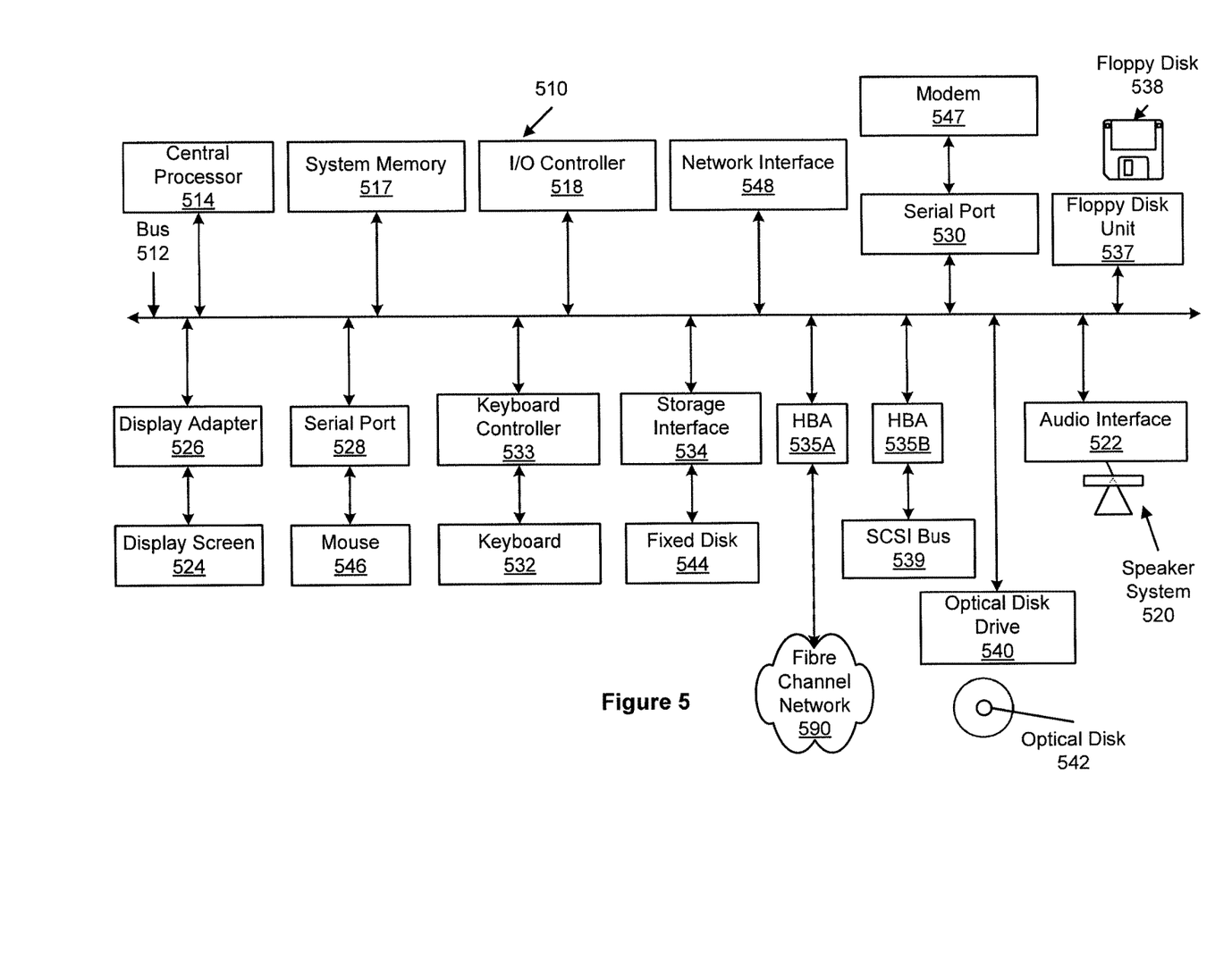
FIG. 5 depicts a block diagram of a computer system suitable for implementing aspects of the present invention.

FIG. 5 depicts a block diagram of a computer system 510 suitable for implementing aspects of the present invention (e.g., servers 120, gateway server 150, clients 160 and web clients 165). Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a Fibre Channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer-readable medium, such as a hard disk drive (e.g., fixed disk 544), an optical drive (e.g., optical drive 540), a floppy disk unit 537, or other storage medium. Additionally, applications can be in the form of electronic signals modulated in accordance with the application and data communication technology when accessed via network modem 547 or interface 548.

Storage interface 534, as with the other storage interfaces of computer system 510, can connect to a standard computer-readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. The operating system provided on computer system 510 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 6:
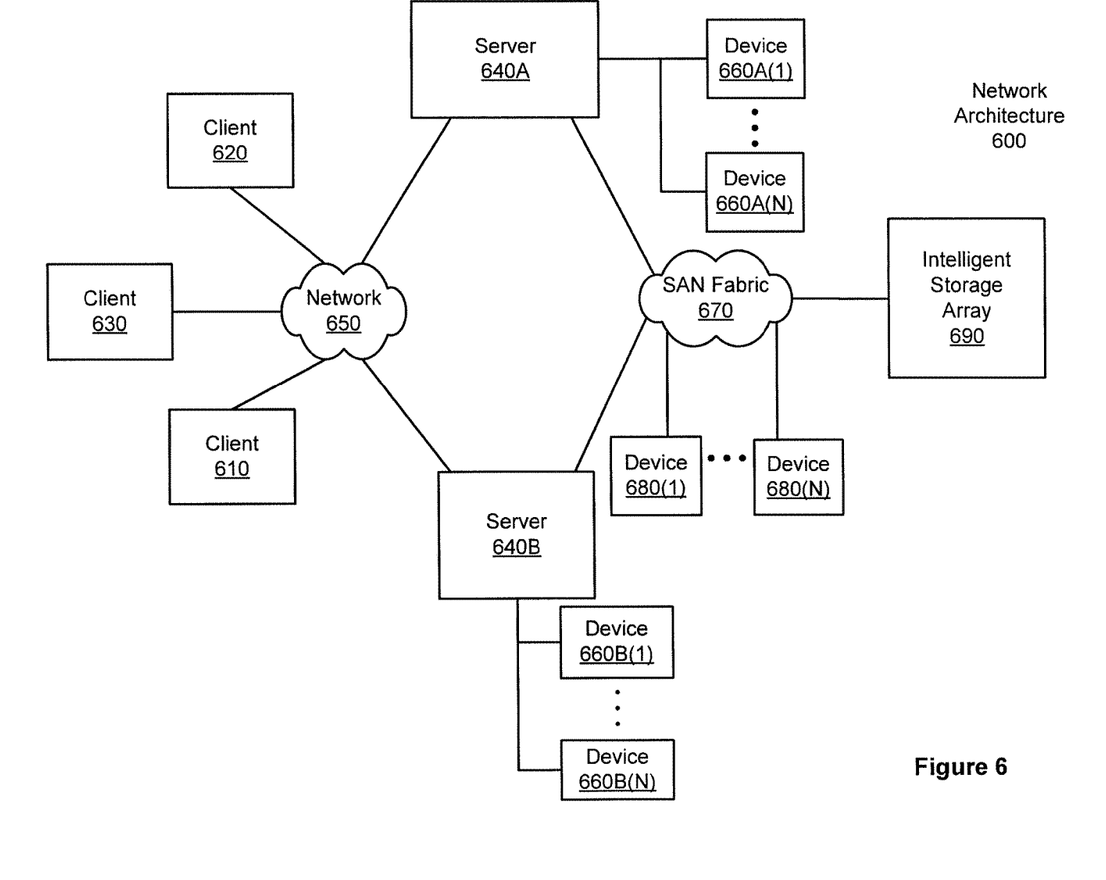
FIG. 6 is a block diagram depicting a network architecture suitable for implementing aspects of the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B(1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1)-(N), 680(1)-(N) or intelligent storage array 690. FIG. 6 depicts the use of a network such as the Internet for exchanging data, but the present invention is not limited to the Internet or any particular network-based environment.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving an incoming record that is awaiting inclusion in a search index;
   storing the incoming record in a first staging data store to queue the incoming record for processing into a form for merging into the search index;
   reading the incoming record from the first staging data store;
   converting the read record into the form for merging into the search index;
   queuing the converted record for entry into the search index by storing the converted record in a second staging data store;
   updating the search index by entering into the search index the converted record stored in the second staging data store;
   searching the search index, the first staging data store, and the second staging data store for one or more records responsive to a search query; and
   displaying records from the search index that are responsive to the search query in a first section of a user interface, records from the first staging data store that are responsive to the search query in a second section of the user interface, and records from the second staging data store that are responsive to the search query in a third section of the user interface, wherein the records from the search index include data that is older than the records from the first staging data store and the records from the second staging data store.

2. The method of claim 1 further comprising:
   receiving search results from said searching; and
   displaying the search results.

3. The method of claim 1 wherein said searching the search index, the first staging data store, and the second staging data store comprises:
   parsing the search query into a search protocol query compatible with a plurality of database records stored in the first staging data store; and
   providing the search protocol query to the first staging data store.

4. The method of claim 1 wherein said searching the search index, the first staging data store, and the second staging data store comprises:
   parsing the search query into a search protocol query compatible with a plurality of sets of information stored in the second staging data store; and
   providing the search protocol query to the second staging data store.

5. The method of claim 1 wherein said searching the search index, the first staging data store, and the second staging data store comprises:
   parsing the search query into a first input format search query for a search engine associated with the search index; and
   providing the first input format search query to the search engine.

6. The method of claim 1 wherein said searching the search index, the first staging data store, and the second staging data store comprises:
   parsing the search query into a second input format search query for a search utility for the first staging data store and the second staging data store; and
   providing the second input format search query to the search utility.

7. The method of claim 1 further comprising:
   storing the second data store in a memory, wherein
     the second staging data store comprises a second database, and
     the second database comprises a search utility for searching the second database.

8. The method of claim 1 further comprising:
   receiving the search query from a remote network node, wherein
     the remote network node is coupled to an enterprise server performing said searching the search index, the first staging data store, and the second staging data store.

9. The method of claim 8 wherein a customer relationship management system comprises the enterprise server, the remote network node, the database, the first staging data store, and the second staging data store.

10. The method of claim 1, further comprising:
    removing the incoming record from the first staging data store, in response to completion of the updating; and
    removing the converted record from the second staging data store, in response to completion of the updating.

11. The method of claim 8, wherein the first staging data store comprises a plurality of database records that are received from a plurality of remote network nodes, and
    the plurality of remote network nodes are coupled to the enterprise server.

12. The method of claim 1, further comprising:
    committing the incoming record to a database, subsequent to the storing the record in the first staging data store, and
    removing the incoming record from the first staging area, wherein
      the removing is performed subsequent to the committing.

13. The method of claim 1, further comprising:
    parsing the search query according to a first format, wherein the first format is configured to allow the search query to be used in the searching of the search index; and
    parsing the search query according to a second format, wherein the second format is configured to allow the search query to be used in the searching of the second staging data store.

14. The method of claim 1, further comprising
recording the incoming record in a master database, wherein
the recording the incoming record in the master data store and the storing the incoming record in the first staging data store are performed substantially simultaneously.

15. The method of claim 1, wherein
the updating the search index comprises merging the converted record into the search index.

16. A computing system comprising:
a first storage volume storing a search index;
a second storage volume storing a database;
a memory storing a first staging data store and a second staging data store; and
a processor, coupled to the first storage volume, the second storage volume, the memory and a display, and configured to
receive an incoming record that is awaiting inclusion in a search index,
store the incoming record in a first staging data store to queue the incoming record for processing into a form for merging into the search index,
read the incoming record from the first staging data store,
convert the read record into the form for merging into the search index,
queue the converted record for entry into the search index by storing the converted record in a second staging data store,
update the search index by entering into the search index the converted record stored in the second staging data store,
search the search index, the first staging data store, and the second staging data store for one or more records responsive to a search query, and
display records from the search index that are responsive to the search query in a first section of a user interface, records from the first staging data store that are responsive to the search query in a second section of the user interface, and records from the second staging data store that are responsive to the search query in a third section of the user interface, wherein the records from the search index include data that is older than the records from the first staging data store and the records from the second staging data store.

17. The computing system of claim 16 wherein the processor is further configured to:
submit a request to a search engine associated with the first storage volume to search the search index for records responsive to the search query,
receive search results from said search engine, the first staging data store, and the second staging data store, and
display the search results using the display.

18. The computing system of claim 16 wherein the processor is further configured to:
parse the search query into a search protocol query compatible with a plurality of database records stored in the first staging data store, and
provide the search protocol query to the first staging data store.

19. The computing system of claim 16 wherein the processor is further configured to:
parse the search query into a search protocol query compatible with a plurality of sets of information stored in the second staging data store, and
provide the search protocol query to the second staging data store.

20. The computing system of claim 16 wherein the processor is configured to perform said submission of the request to the search engine associated with the first storage volume by being further configured to:
parse the search query to a first input format search query for the search engine; and
provide the first input format search query to the search engine.

21. The computing system of claim 16 wherein the processor is further configured to:
parse the search query to a second input format search query for a search utility for the first staging data store and the second staging data store; and
provide the second input format search query to the search utility.

22. The computing system of claim 16 wherein the processor is further configured to:
store the second staging data store in a memory, wherein the second staging data store comprises a second database, and
the second database comprises a search utility for searching the second database.

23. The computing system of claim 16 wherein the processor is further configured to:
receive the search query from a remote network node coupled to the computing system.

24. The computing system of claim 23 wherein a customer relationship management system comprises the computing system, the remote network node, the first storage volume, the memory, and the second storage volume.

25. A non-transitory computer-readable storage medium, storing instructions, when executed by a processor, cause the processor to:
receive an incoming record that is awaiting inclusion in a search index;
store the incoming record in a first staging data store to queue the incoming record for processing into a form for merging into the search index;
read the incoming record from the first staging data store;
convert the read record into the form for merging into the search index;
store the converted record in a second staging data store to queue the converted record for entry into the search index;
update the search index by entering into the search index the converted record stored in the second staging data store;
search the search index, the first staging data store, and the second staging data store for one or more records responsive to a search query; and
display records from the search index that are responsive to the search query in a first section of a user interface, records from the first staging data store that are responsive to the search query in a second section of the user interface, and records from the second staging data store that are responsive to the search query in a third section of the user interface, wherein the records from the search index include data that is older than the records from the first staging data store and the records from the second staging data store.

26. The non-transitory computer-readable storage medium of claim 25 wherein the instructions further cause the processor to:
receive search results from the search index, the first staging data store, and the second staging data store; and
display the search results.

* * * * *

UNITED STATES PATENT AND TRADEMARK OFFICE
CERTIFICATE OF CORRECTION

PATENT NO. : 9,792,307 B2  
APPLICATION NO. : 12/844310  
DATED : October 17, 2017  
INVENTOR(S) : Hari Krishna Gutlapalli et al.

Page 1 of 1

It is certified that error appears in the above-identified patent and that said Letters Patent is hereby corrected as shown below:

In the Claims

Claim 17, Column 13, Line 55:
"receive search results from said search engine" should read -- receive search results from the search engine --.

Signed and Sealed this
Twenty-seventh Day of November, 2018

Andrei Iancu
*Director of the United States Patent and Trademark Office*